(12) United States Patent
Kürzinger et al.

(10) Patent No.: US 6,303,175 B1
(45) Date of Patent: Oct. 16, 2001

(54) GELLED FOODSTUFF FOR AQUATIC ANIMALS

(75) Inventors: Hubert Kürzinger, Melle; Dietmar Kuhlmann, Stadthagen, both of (DE)

(73) Assignee: Warner-Lambert Company, Morris Plains, NJ (US)

( * ) Notice: Subject to any disclaimer, the term of this patent is extended or adjusted under 35 U.S.C. 154(b) by 0 days.

(21) Appl. No.: 09/486,950

(22) PCT Filed: Aug. 21, 1998

(86) PCT No.: PCT/EP98/05317

§ 371 Date: Jun. 22, 2000

§ 102(e) Date: Jun. 22, 2000

(87) PCT Pub. No.: WO99/12430

PCT Pub. Date: Mar. 18, 1999

(30) Foreign Application Priority Data

Sep. 6, 1997 (DE) .............................. 197 39 167

(51) Int. Cl.$^7$ ...................................... A23L 1/05
(52) U.S. Cl. ................... 426/573; 426/576; 426/641; 426/654; 426/805
(58) Field of Search ................... 426/573, 805, 426/576, 641, 654

(56) References Cited

U.S. PATENT DOCUMENTS

| | | | |
|---|---|---|---|
| 3,591,389 | * | 7/1971 | Schneider ................................ 99/3 |
| 3,889,007 | * | 6/1975 | Gunter et al. . |
| 4,935,250 | * | 6/1990 | Cox ........................................ 426/94 |

FOREIGN PATENT DOCUMENTS

| | | |
|---|---|---|
| 0137748 | 4/1985 | (EP) . |
| 0577034 | 1/1994 | (EP) . |
| 2175486 | 12/1986 | (GB) . |
| 021187 | 2/1977 | (JP) . |
| WO9421139 | 9/1994 | (WO) . |
| WO9528830 | 11/1995 | (WO) . |
| WO9700021 | 1/1997 | (WO) . |
| WO9708960 | 3/1997 | (WO) . |

\* cited by examiner

Primary Examiner—Chhaya D. Sayala
(74) Attorney, Agent, or Firm—Darryl C. Little; Evan J. Federman

(57) ABSTRACT

The subject of the invention is a gel-like feed for aquatic animals, especially fish, shrimps and invertebrates, in fresh and sea water, usable as replacement of frost feed for the nutrition of warm and cold water ornamental fish in an aquarium. An ornamental fish feed is preferred which contains 0.001–50% of gel former, 0.1–90% of natural feed and, depending upon the purpose of use, further additives, in the case of a water content of 20–99%. A feed is especially preferred which contains 0.1–10% of gel former, 1–20% of natural feed and, depending upon the purpose of use, further additives in the case of a water content of 50–99%.

14 Claims, No Drawings

GELLED FOODSTUFF FOR AQUATIC ANIMALS

The invention concerns an industrially producable feed for aquatic animals in fresh and sea water, especially fish, shrimps and invertebrates, also usable as replacement of frozen natural feed (frost feed) for warm and cold water ornamental fish in the form of a viscous gel.

The feeding of frozen natural feed (e.g. saline crabs=Artemia; krill; water-fleas=Daphnia; stream flea crabs=Gammarus; sludge tubular worms=Tubifex; red midge larvae=Chironomus; white midge larvae=Chaoborus; black midge larvae =Culex; zooplankton=Cyclops; fish roe; calf heart; menus=combination products) to warm and cold water ornamental fish is known. Specialised aquariarists often exclusively feed living feed, FD (=freeze dried) natural feed and/or frost feed. However, the preponderant majority of aquariarists administer any feed (flakes, extrudates, tablets, pellets), in part in combination with the above-mentioned types of feed.

The analysis of frost feed provides data for the chemical composition: the average water content or content of dry substance amounts to 90–95% and 5–10% respectively. Thus, frost feed is characterised by a very high content of water.

Feed animals in frozen state are sold in the form of blocks, sheets or cubes. For the storage of frost feed, not only in the case of the trader but also in the case of the aquariarist, a freezer storage is necessary. For this form of feed conservation, a deep freezer or a freezer compartment in the refrigerator is necessary in which temperatures clearly below 0° C. can be produced. The deep-frozen feed is either first thawed by the aquariarist and then fed or, however, is introduced in the frozen state into the aquarium water. Due to the usually relatively high water temperature of about 20–30° C., the natural feed thaws rapidly and can be eaten by the ornamental fish. However, after the thawing the feed is to be given quickly since it decomposes rapidly. Feed once thawed must not be frozen again. In the refrigerator, deep frozen feed can be kept 3–4 days, in the case of temperatures clearly below 0° C. it is storable for a maximum of one year.

Therefore, it is the task of the invention to make available an industrially producable feed for aquatic animals, especially fish, shrimps and invertebrates, usable in fresh and sea water, which is usable in the aquarium especially for warm and cold water ornamental fish as potential replacement for frost feed without thereby displaying the described disadvantages of deep frozen feed.

Surprisingly, it has now been found that, by the use of gel formers, preferably a combination of several gel formers, and above-mentioned natural feeds alone or in combination, as well as possibly additional natural raw materials (e.g. Spirulina algae), vitamins, mineral materials, aroma materials, preservation agents and other additives, a feed can be produced industrially which is usable as replacement for frost food and, at normal room temperature, is storable without problems and thus possesses clearly improved handling properties as frost food.

Therefore, the subject of the invention is a feed for aquatic animals, especially fish, shrimps and invertebrates, in fresh and sea water, usable as replacement of frost feed for the nutrition of warm and cold water ornamental fish in the aquarium in form of a viscous gel.

An ornamental fish feed is preferred which contains 0.001–50% of gel former, 0.1–90% of natural feed and, depending upon the purpose of use, further additives, in the case of a water content of 20–99%. A feed is especially preferred which contains 0.1–10% of gel former, 1–20% of natural feed and, depending on the purpose of use, further additives, in the case of a water content of 50–99%.

The viscosity of gel-like feed of the invention is in a range of 1 to $2\times10^6$ mpa•s, preferably in the range of $1\times10^2$ to $1\times10^6$ mpa•s and especially preferred in the range of $1,5\times10^2$ to $5\times10^5$ mpa•s.

Suitable gel formers can be synthetic, semisynthetic or of natural origin.

Synthetic gel formers are, for example, cellulose ethers, such as alkyl- and/or hydroxyalkyl-substituted cellulose ethers with 1 to 4 carbon atoms in the alkyl chain, preferably methylcellulose, hydroxyethylcellulose, hydroxypropylcellulose, hydroxyethylmethyl-cellulose, hydroxyethylethylcellulose, hydroxypropyl-methylcellulose or the like. HPMC is especially preferred.

Natural gel formers or semi-synthetic gel formers or ones obtained in biotechnological ways are hydrocolloids of vegetable, animal or bacterial origin, such as e.g. polysaccharides, vegetable gums or collagens. These are obtained from natural algae, natural vegetable seed gums, natural vegetable juices, natural fruit extracts, biosynthetic gums, biosynthetically modified starches or cellulose materials or exocellular polysaccharides. There are suitable, for example, pectins, alginates, carrageenan, agar agar, guar gum, gum arabic, tragacanth, Karaya gum, ghatti gum, locust bean flour, arabian, gellan, konjacmannan, galactomannan, funoran, sago, tara gum, xanthans, acetan, welan, rhamsan, furcelleran, succinoglycan, scleroglycan, schizophyllan, tamarind gum, curdlan, pullulan, dextran or gelatine. Especially preferred is agar agar.

The mentioned gel formers can be used alone or preferably in synergistic combinations improving the acceptance and the properties of the feed.

For the improvement of the properties and, above all, of the acceptance, the feed mixtures according to the invention can additionally contain softeners or moisture retainers, such as e.g. glycerol, polyethylene glycol, propylene glycol, glycine, sorbitol, mannitol, canesugar, maize syrup, fructose, dioctyl sodium sulphosuccinate, triethyl citrate, tributyl citrate, 1,2-propylene glycol, mono-, di- or triacetates of glycerol, acetamide, formamide or lactamide, namely, alone or in synergistic combinations.

For the improvement of the consistency and of the holding together of the feed mixture, additional chelate formers can be contained therein, such as e.g. ethylenediamine-tetraacetic acid, acetic acid, boric acid, citric acid, gluconic acid, lactic acid, phosphoric acid, tartaric acid, as well as salts of the said acids or metaphosphates, dihydroxyethylglycine, lecithin or beta-cyclodextrin or mixtures thereof.

The preferred gel-like feed of the invention is a complete substitute of frost feed. It contains preferably natural feed as complete animals or parts. Preferred kinds of natural feed are saline crabs (Artemia); krill; water-fleas (Daphnia); stream flea crabs (Gammarus); sludge tubular worms (Tubifex); red midge larvae (Chironomus); white midge larvae (Chaoborus); black midge larvae (Culex); zooplankton (Cyclops); Bosmina; Mysis; shrimps; maggots; meal-worms; fish roe; crab eggs; mussel meat; fish meat; cuttlefish or calf heart which are used alone or in combinations as whole animals and/or parts therof.

The recipe of the novel feed is composed of various components. Favourable for the consistency of the feed, as well as the holding together of the particles are gel formers, e.g. agar agar, a gelling agent produced from marine algae belonging to the hydrocolloid group. Agar agar is a dried hydrophilic colloid substance of gigantic molecules which have a linear, filament-formed construction and consist above all of galactose. For the production, some types of the red algae are used, namely, Gelidium and Gracellaria. The hydrocolloid is not soluble in cold water but is practically completely soluble at higher temperatures. The melting point lies at about 90° C., the gel point at about 35–40° C., with formation of a strong, clear, thermoreversible gel which first melts again at temperatures above 85° C.

The gel-like feed according to the invention is expediently produced by means of an extruder from one or more natural types of feed and/or commercially available feed mixtures, raw materials and one or more gelformers, as well as possibly usual vitamins, mineral, colouring, aroma, lure and preservation materials with addition of large amounts of water or, however, worked up by means of impeller-type mixers. The forming, cooling and packaging takes place subsequently.

Preferably the feed is directly filled in ready to use form in jars, cans, bags, tubes or the like or packaged as cylindrically-shaped sticks. It can also be treated by further drying and thereafter further processed to feed forms like granulates, cubes, plates, flakes or tablets which, if necessary, have to be reconditioned with water shortly before feeding. If natural feeds, such as e.g. midge larvae, Daphnias or planktonic animals are worked up then it can be further worked up in dry, fresh or thawed state with or without liquid.

As preservatian agents, there usually find use ethoxyquin, BHT, calcium propionate, potassium sorbate, citric acid, lactic acid or salt (cooking or sea salt).

For lowering the pH value, there are also used commercially available components, such as e.g. lactic acid or hydrochloric acid.

The pieces of feed according to the invention are relatively large with regard to the mostly smaller ornamental fish. Therefore, the feed offered cannot be eaten as a whole, on the contrary the fish bite small pieces therefrom. It is a prerequisite that, by suitable choice of one or more gel formers, under certain conditions in combination with other nutritional components, the consistency of the feed is so adjusted that the fish, because of the soft property, can bite off, without problems, mouth-sized pieces and subsequently swallow. A further possibility consists in the production and application of a feed, the gel formers of which, because of their specific dissolving behaviour, dissolve wholly or partly in the water and thus liberate the nutritional components.

Examples for possible feed recipes:

|  | Variant 1 | Variant 2 |
| --- | --- | --- |
| gel former | 1.5–5.5% | 0.5–10% |
| preservation agent | 0.1–12.4% | 0.15–11.9%, |
| natural feed | 0.1–9% | 0–3% |
| aroma materials | — | 1–10% |
| colorant | — | –0.05% |
| water | 73–94% | 70–90% |

What is claimed is:

1. A frost feed replacement for fresh and sea water aquatic animals in the form of a gel, comprising
   a.) 0.001–50% of gel former;
   b.) 0.1–90% of natural feed as complete animals; and
   c.) a water content of 50–99% by weight
wherein the gel is formed at temperatures elevated enough for gel former to react with water, the gel formation occurring prior to contact with the aquatic environment of the aquatic animals and wherein the gel has a viscosity of 1 to $2 \times 10^6$ mpa•s such that it resembles frozen natural feed sufficiently to act as replacement for frozen natural feed.

2. A feed according to claim 1, containing 0.1–10% of gel former, 1–20% of natural feed and a water content of 50–99% by weight.

3. A feed according to claim 1, wherein the gel former is selected from the group consisting of alkyl- and/or hydroxyalkyl-substituted cellulose ethers with 1 to 4 carbon atoms in the alkyl chain, polysaccharides, vegetable gums, collagens or mixtures thereof.

4. A feed according to claim 3, characterized in that the cellulose ether is selected from the group of methylcellulose, hydroxyethylcellulose, hydroxypropylcellulose, hydroxyethylmethylcellulose, hydroxyethylethylcellulose or hydroxypropylmethylcellulose.

5. A feed according to claim 3, characterised in that the gel former is selected from the group of pectins, alginates, carrageenan, agar agar, guar gum, gum arabic, tragacanth, Karaya gum, ghatti gum, locust bean flour, arabian, gellan, Konjacmannan, galactomannan, funoran, sago, tara gum, xanthans, acetan, welan, rhamsan, furcelleran, succinoglycan, scleroglycan, schizophyllan, tamarind gum, curdlan, pullulan, dextran or gelatine.

6. A feed according to claim 1, further comprising a softener or moisture retainer.

7. A feed according to claim 6, characterized in that glycerol is used as softener.

8. A feed according to claim 1, characterized in that it contains preservation agents.

9. A feed according to claim 8, wherein the preservation agents are selected from the group consisting of ethoxyquin, BHT, calcium propionate, potassium sorbate, citric acid, lactic acid or salt.

10. A feed according to claim 1, characterized in that it contains additional natural raw materials.

11. A feed according to claim 1, characterized in that it contains additionally vitamins, mineral, aroma, lure, colour and/or carotenoids.

12. A process for the production of a feed according to claim 1, characterized in that one or more natural types of feed and/or commercially available feed mixtures, raw materials are mixed with one or more gel formers, and water in an extruder at temperatures elevated enough to produce a reaction between the gel former and water and subsequently, with cooling, the mixture is formed by means of an extruder to give cylinder-shaped sticks, granulates, cubes, plates, flakes or tablets of water content of from 20–99% by weight and these filled into glasses, tins, blister packs or, directly after the extruder, packed and subsequently cooled.

13. A process for the production of a feed according to claim 1, characterized in that one or more kinds of natural feed and/or commercially available feed mixtures, raw materials are mixed with one or more gel formers, and water at temperatures elevated enough to produce a reaction between the gel former and water, the mixing by means of stirrers and homogenisation devices and subsequently, with cooling, the mixture is formed to give cylinder-shaped sticks, granulates, cubes, plates, flakes or tablets of water content of from 20–99% by weight and these filled into glasses, tins, blister packs or packed directly and subsequently cooled.

14. A frost feed replacement for fresh and sea water aquatic animals in the form of a gel, comprising
   a.) 0.001–50% of gel former;
   b.) 0.1–90% of natural feed as complete animals or animal parts selected from the group consisting of saline crabs (Artemia); krill; water-fleas (Daphnia); stream flea crabs (Gammarus); sludge tubular worms (Tubifex); red midge larvae (Chironomus); white midge larvae (Chaoborus); black midge larvae (Culex); zooplankton (Cyclops); Bosmina; Mysis; shrimps; maggots; mealworms; fish roe; crab eggs; mussel meat; fish meat; cuttlefish and/or calf heart alone or in combinations; and c.) a water content of 50–99% by weight wherein the gel is formed at temperatures elevated enough for gel former to react with water, the gel formation occurring prior to contact with the aquatic environment of the aquatic animals and wherein the gel has a viscosity of 1 to $2 \times 10^6$ mpa.s such that it resembles frozen natural feed sufficiently to act as replacement for frozen natural feed.

* * * * *